June 4, 1929.　　　　H. R. RITCHIE　　　　1,715,677
ROTARY SIPHON DEVICE FOR STEAM DRUMS
Filed Aug. 31, 1928

INVENTOR.
Harry R. Ritchie
BY Chapin & Neal
ATTORNEYS.

Patented June 4, 1929.

1,715,677

UNITED STATES PATENT OFFICE.

HARRY R. RITCHIE, OF SPRINGFIELD, MASSACHUSETTS, ASSIGNOR TO A. W. HOLBROOK, INC., OF PALMER, MASSACHUSETTS, A CORPORATION OF MASSACHUSETTS.

ROTARY SIPHON DEVICE FOR STEAM DRUMS.

Application filed August 31, 1928. Serial No. 303,353.

In the use of drums which are heated by means of steam circulated throughout their interior it is necessary to drain from the inside of the drum the water which is formed by the condensation of steam. In certain installations it is possible to use a straight stationary pipe entering the drum through a stuffing box in one end and extending to a point adjacent the lowest portion of the drum. The pressure of the steam within the drum will blow out through this pipe any water or condensation. With other types of drum construction, however, this simple expedient is not available. For example, if the drum is constructed with tie rods joining its ends or with any other mechanical obstruction it is impossible to use a stationary pipe as the tie rods or the obstruction would strike this pipe during the rotation of the drum. It is the object of my invention to provide a simple and effective connection by means of which water condensation may be removed from a rotating drum without regard to the internal construction of the drum.

I have illustrated my invention in the accompanying drawings in which—

Figure 1:
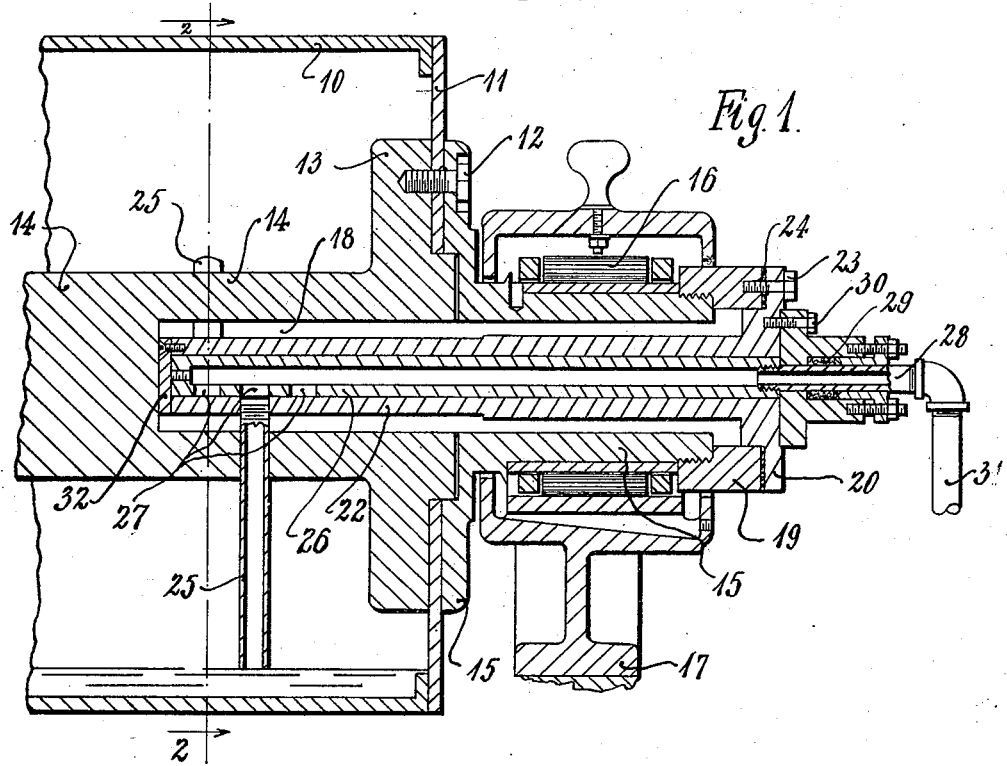
Figure 2:
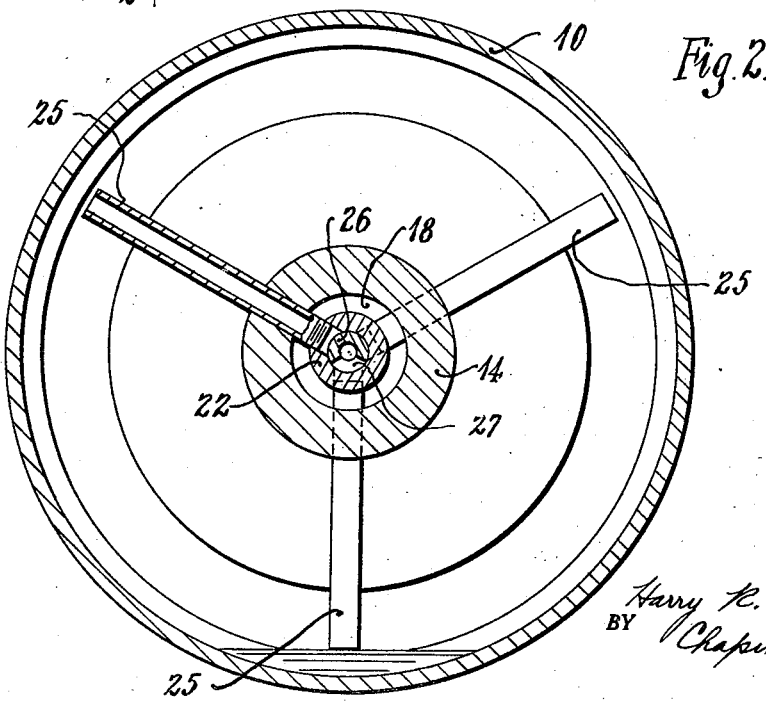

Fig. 1 is a vertical section taken along the axis of a drum equipped with my improved drainage device; and Fig. 2 is a cross section thereof on line 2—2 of Fig. 1.

The drum 10 may be formed in any usual or desired manner—for example, of a sheet of metal having its edges butt-welded together and joined at its ends to end plates 11. The end plates are joined by bolts 12 with the hub portions 13 of a drum supporting shaft 14 preferably extending from one end of the drum to the other. Outer hub portions 15 are also secured by the bolts 12 and are fitted to ride in roller bearings 16 suitably supported upon pedestals 17. This type of drum construction is conventional only and in its details does not form a part of my invention.

One end of the shaft 14 and the hub 15 are provided with an axially extending recess 18. At its open end the hub 15 is provided with a gland 19 receiving a flange 20 at the end of a sleeve 22 extending inwardly through the recess. The flange 20 is preferably attached to the gland by bolts 23 and a suitable packing 24.

A plurality of pipes 25, here shown as three in number, are spaced from each other both circumferentially of the sleeve and in a direction along its axis. The pipes extend radially outwardly from the sleeve through holes formed in the shaft 14 and have their outer open ends terminating closely adjacent the inner surface of the drum 10. The inner ends of the pipes open into the interior of the sleeve through holes formed in the latter. As a convenient method of construction the pipes are simply threaded into tapped holes formed in the sleeve.

Extending within the sleeve and preferably fitted thereto with a running fit in order to eliminate steam leakage between them is a valve tube 26. At points in line with the inner ends of the pipes 25 the valve tube is formed with ports 27. Instead of being spaced from each other circumferentially of the valve tube, as was the case with the pipes 25, these ports are in alignment with each other in a direction along the axis and are located at the lowermost portion of the valve tube in spaced positions horizontally. The ports may be simple circular holes or may extend throughout a small portion of the circumference of the valve tube so as to maintain registration with the inner ends of the tubes during a considerable portion of a revolution. Preferably these ports each subtend an arc of about 120°. The outer end of the valve tube 26 is threaded to a pipe 28 which passes through a stuffing box indicated generally at 29 and secured by bolts 30 to the flange 20. The pipe 28 is secured to a stationary pipe 31 leading to any suitable place where the water condensation may be ejected. The inner end of the sleeve 22 is closed by means of a plate 32 so as to preserve a fluid-tight joint at both ends between the sleeve and the valve tube.

In the operation of the steam drum it will be observed that the drum, the shaft 14, the sleeve 22, and the pipes 25 rotate simultaneously. Since the pipes rotate with the drum they will not be interfered with by any internal construction such as tie rods. The valve tube 26, however, remains stationary due to its connection with the pipe 31. As the pipes 25 rotate toward their downwardly pointing position their inner ends come successively into registration with the several ports 27 in the valve tube. As each pipe registers with its port, connection is formed between the interior of the drum and the pipe 31. Since the outer end of the pipe 25 making this connection, however, is near the bottom of the drum it will lie below the level of the water condensation and the latter will be blown out through the pipe and the valve tube by the pressure of the steam within the drum. Connection between the pipes 25 and the valve tube lasts only during the period when each tube points downwardly and, therefore, there is no waste due to the steam exhausting directly into the waste pipe 31.

It will be seen from the foregoing description that I have provided a structure which is simple and inexpensive to make and assemble, and which leaves the exterior of the drum with a neat and simple appearance.

What I claim is:

1. In a device of the class described, a drum, means for supporting the drum for rotation, a stationary cylindrical hollow valve member extending within the drum along the axis thereof, a cylindrical sleeve coaxial with the valve member and closely surrounding the same so as to extend also within the drum, said sleeve being rotatable on the valve member with the drum, and a plurality of pipes spaced circumferentially around the sleeve, secured thereto, and extending radially outwardly therefrom with their outer open ends spaced slightly from the inner surface of the drum and their inner ends communicating with the interior of the sleeve, the valve member being radially ported to permit the pipes to communicate successively with the interior of the valve member as they come into downwardly pointing position.

2. In a device of the class described, a drum, means for supporting the drum for rotation, a stationary cylindrical hollow valve member extending within the drum along the axis thereof and having a plurality of aligned downwardly opening ports spaced from each other in the direction of the axis of the valve member, a cylindrical sleeve coaxial with the valve member and closely surrounding the same so as to extend also within the drum, said sleeve being rotatable on the valve member with the drum, and a plurality of pipes both spaced circumferentially around the sleeve and spaced axially along it at intervals corresponding with the axial spacing of the ports in the valve member, said pipes being secured to the sleeve and extending radially outwardly therefrom with their outer open ends spaced slightly from the inner surface of the drum and their inner ends communicating with the interior of the sleeve, whereby the pipes register successively with their respective ports in the valve member as the pipes come into downwardly pointing position.

3. In a device of the class described, a drum, an axially recessed shaft supporting the drum and rotatable therewith, means for supporting the shaft for rotation, a cylindrical sleeve extending axially within the recess of the shaft to a point within the drum, a plurality of pipes spaced circumferentially about the sleeve, secured thereto, and extending radially therefrom through the shaft with their outer open ends spaced slightly from the inner surface of the drum and their inner ends communicating with the interior of the sleeve, and a stationary cylindrical valve member fitted fluid-tight within the sleeve and extending axially into it to a point within the drum, the valve member being radially ported to permit the pipes to communicate successively with the interior of the valve member as they come into downwardly pointing position.

4. In a device of the class described, a drum, an axially recessed shaft supporting the drum and rotatable therewith, means for supporting the shaft for rotation, a cylindrical sleeve extending axially within the recess of the shaft to a point within the drum, a plurality of pipes spaced both circumferentially around the sleeve and axially along it, secured thereto, and extending radially therefrom through the shaft with their outer open ends spaced slightly from the inner surface of the drum and their inner ends communicating with the interior of the sleeve, and a stationary cylindrical valve member fitted fluid tight within the sleeve and extending axially into it to a point within the drum, the valve member having a series of aligned downwardly opening ports spaced from each other in the direction of the axis of the valve member at intervals corresponding to the axial spacing of the pipes carried by the sleeve, whereby the pipes register successively with their respective ports as the pipes come into downwardly pointing position.

In testimony whereof I have affixed my signature.

HARRY R. RITCHIE.